US007027768B2

(12) United States Patent
Hill

(10) Patent No.: US 7,027,768 B2
(45) Date of Patent: Apr. 11, 2006

(54) METHOD AND SYSTEMS USING A SET-TOP BOX AND COMMUNICATING BETWEEN A REMOTE DATA NETWORK AND A WIRELESS COMMUNICATION NETWORK

(75) Inventor: George E. Hill, Stone Mountain, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 431 days.

(21) Appl. No.: 10/269,608

(22) Filed: Oct. 11, 2002

(65) Prior Publication Data

US 2003/0092377 A1 May 15, 2003

Related U.S. Application Data

(60) Provisional application No. 60/329,221, filed on Oct. 12, 2001.

(51) Int. Cl.
*H04H 1/14* (2006.01)

(52) U.S. Cl. .................. 455/3.06; 455/466; 455/556.1; 725/26

(58) Field of Classification Search ............... 455/3.01, 455/3.02, 66.1, 344, 556.1, 557, 466, 414.1, 455/41.2, 471, 3.06; 725/26
See application file for complete search history.

(56) References Cited

U.S. PATENT DOCUMENTS

| 4,901,307 | A | | 2/1990 | Gilhousen et al. ............ 370/18 |
| 5,103,459 | A | | 4/1992 | Gilhousen et al. ............ 375/1 |
| 5,396,546 | A | | 3/1995 | Remillard .................... 379/96 |
| 5,404,393 | A | | 4/1995 | Remillard .................... 379/96 |
| 5,461,667 | A | | 10/1995 | Remillard .................... 379/96 |
| 5,481,542 | A | | 1/1996 | Logston et al. ............ 370/94.2 |
| 5,533,097 | A | * | 7/1996 | Crane et al. ............. 455/552.1 |
| 5,561,708 | A | | 10/1996 | Remillard .................... 379/96 |
| 5,561,709 | A | * | 10/1996 | Remillard ................ 379/93.19 |
| 5,619,250 | A | | 4/1997 | McClellan et al. ........... 348/10 |
| 5,636,211 | A | * | 6/1997 | Newlin et al. .............. 370/465 |
| 5,636,264 | A | | 6/1997 | Sulavuori et al. ............. 379/56 |
| 5,680,399 | A | | 10/1997 | Totzke et al. ............... 370/468 |
| 5,701,415 | A | | 12/1997 | Wei ....................... 395/200.09 |
| 5,708,961 | A | * | 1/1998 | Hylton et al. ................. 725/81 |
| 5,764,899 | A | | 6/1998 | Eggleston et al. ..... 395/200.33 |
| 5,793,413 | A | | 8/1998 | Hylton et al. ................. 348/12 |
| 5,805,997 | A | | 9/1998 | Farris ........................ 455/461 |
| 5,812,930 | A | * | 9/1998 | Zavrel ........................ 725/62 |
| 5,844,552 | A | | 12/1998 | Gaughan et al. ............ 345/327 |
| 5,886,732 | A | | 3/1999 | Humpleman ................ 348/10 |
| 5,905,521 | A | | 5/1999 | Gatto et al. .................... 348/6 |
| 5,930,247 | A | | 7/1999 | Miller, II et al. ........... 370/338 |
| 5,969,714 | A | | 10/1999 | Butcher ...................... 345/327 |

(Continued)

FOREIGN PATENT DOCUMENTS

BR   PI 9503452-8 A   5/1996

(Continued)

*Primary Examiner*—Tilahun Gesesse
(74) *Attorney, Agent, or Firm*—Merchant & Gould

(57) ABSTRACT

Disclosed are methods and systems for connecting a set-top box (STB) to the Internet over existing and future wireless networks, combining television with wireless Internet access. A conventional television is used in combination with a STB that has a wireless or wired keyboard, a power supply, and audio/visual connections for connecting the STB to the television. In an embodiment, a wireless telephone is placed in a docking station on top of the STB, providing the user with both data (when docked) and voice capabilities (when being used simply for telephone calls). CDMA, CDPD, or other wireless technologies may used for connection to the Internet.

4 Claims, 2 Drawing Sheets

U.S. PATENT DOCUMENTS

| | | | |
|---|---|---|---|
| 5,977,963 A | 11/1999 | Gaughan et al. | 345/327 |
| 5,990,882 A * | 11/1999 | Heinonen et al. | 725/133 |
| 6,008,836 A | 12/1999 | Bruck et al. | 348/6 |
| 6,020,914 A | 2/2000 | Douhet | 348/14 |
| 6,161,133 A | 12/2000 | Kikinis | 709/220 |
| 6,188,873 B1 | 2/2001 | Wickman et al. | 455/11.1 |
| 6,192,041 B1 | 2/2001 | Phillips | 370/338 |
| 6,198,915 B1 | 3/2001 | McGregor et al. | 455/406 |
| 6,282,715 B1 | 8/2001 | Barraud | 725/117 |
| 6,289,213 B1 * | 9/2001 | Flint et al. | 455/420 |
| 6,311,058 B1 | 10/2001 | Wecker et al. | 455/418 |
| 6,507,590 B1 | 1/2003 | Terho et al. | 370/466 |
| 6,600,734 B1 * | 7/2003 | Gernert et al. | 370/352 |
| 6,816,724 B1 * | 11/2004 | Asikainen | 455/414.1 |
| 6,901,241 B1 * | 5/2005 | Bjorndahl | 455/41.2 |
| 2001/0030950 A1 * | 10/2001 | Chen et al. | 370/329 |
| 2003/0030652 A1 * | 2/2003 | Billmaier et al. | 345/629 |
| 2005/0028208 A1 * | 2/2005 | Ellis et al. | 725/58 |

FOREIGN PATENT DOCUMENTS

| | | |
|---|---|---|
| BR | PI 9408030-5 A | 12/1996 |
| BR | PI 9508491-6 A | 12/1997 |
| BR | PI 9714609-9 A | 5/2000 |
| BR | PI 9714685-4 A | 7/2000 |
| BR | PI 9810774-7 A | 9/2000 |
| EP | 0535572 A2 | 4/1993 |
| EP | 0681397 A2 | 11/1995 |
| EP | 0698982 A2 | 2/1996 |
| EP | 0698998 A1 | 2/1996 |
| EP | 0719047 B1 | 6/1996 |
| EP | 0723369 A1 | 7/1996 |
| EP | 0821525 A1 | 1/1998 |
| EP | 0838950 A1 | 4/1998 |
| EP | 0893913 A1 | 1/1999 |
| EP | 0912049 A1 | 4/1999 |
| EP | 0915621 A2 | 5/1999 |
| EP | 0928105 A1 | 7/1999 |
| EP | 1059809 A2 | 12/2000 |
| EP | 1100263 A1 | 5/2001 |
| EP | 1175068 A1 | 1/2002 |
| EP | 1175069 A1 | 1/2002 |
| FR | 2744585 | 8/1997 |
| GB | 2307628 A | 5/1997 |
| GB | 2328824 A | 3/1999 |
| GB | 2329309 A | 3/1999 |
| GB | 2329310 A | 3/1999 |
| GB | 2342819 A | 4/2000 |
| GB | 2343597 A | 5/2000 |
| WO | WO 98/12874 | 3/1998 |
| WO | WO 98/17063 | 4/1998 |
| WO | WO 01/47295 A1 | 6/2001 |

* cited by examiner

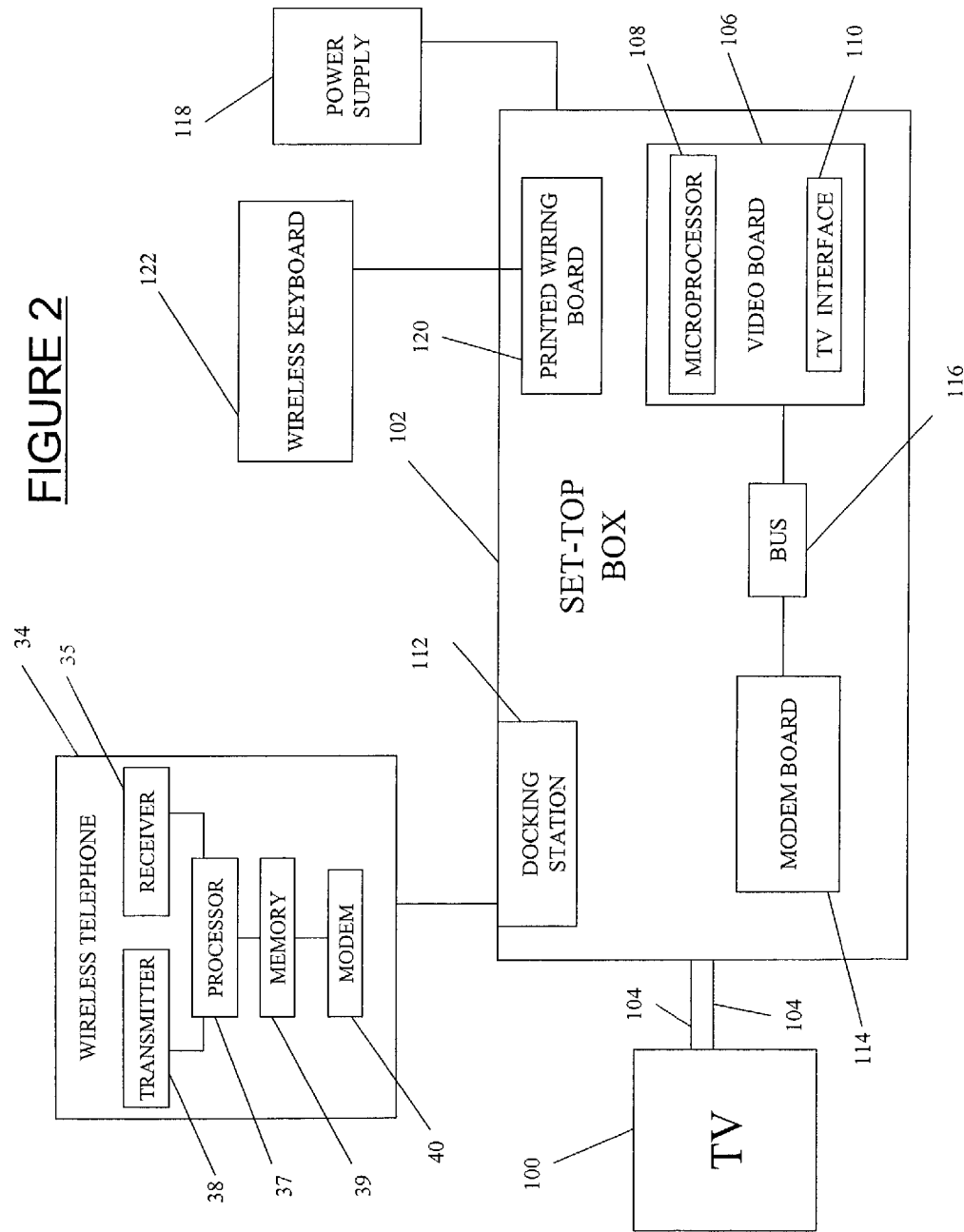

METHOD AND SYSTEMS USING A SET-TOP BOX AND COMMUNICATING BETWEEN A REMOTE DATA NETWORK AND A WIRELESS COMMUNICATION NETWORK

This application claims the benefit of U.S. Provisional Application No. 60/329,221, filed Oct. 12, 2001, entitled "Method and System of Wireless Transmission and Reception of Data for Display on a Conventional Television Using a Set-Top Box", which document is incorporated herein by reference in its entirety.

FIELD OF THE INVENTION

The invention generally relates to the field of wireless data transmission and reception. The invention particularly relates to a data transmission and reception system including systems and methods for using a wireless telephone to receive and transmit packet signals via a wireless or cellular network for display on a standard television using a set-top box.

BACKGROUND OF THE INVENTION

In recent years, the use of wireless communications devices has greatly increased around the world. Specifically, the use of wireless telephones has become commonplace such that many users, or subscribers, to wireless services use wireless telephones with regularity. The coverage area of a wireless telecommunications network such as a cellular network including cellular mobile telephones is divided into smaller coverage areas called "cells" using low power transmitters and coverage-restricted receivers. As is well known in the art, the limited coverage area enables the radio channels used in one cell to be reused in another cell. In a typical cellular telecommunications network, as a mobile cellular telephone within one cell moves across the boundary of the cell into an adjacent cell, control circuitry associated with the cell detects that the signal strength of the telephone in the adjacent cell is stronger and communications with the mobile cellular telephone are "handed off" to the adjacent cell.

While the technology for Internet access via wireline or landline telephone systems is well established, the technology for Internet access for wireless users is now emerging. There are several standards for wireless service including, but not limited to, Advanced Mobile Phone Service (AMPS), Digital Advanced Mobile Phone Service (DAMPS), Global System for Mobile Communications (GSM), General Packet Radio Service (GPRS), Code Division Multiple Access (CDMA, early versions being described in standards document IS-95 and U.S. Pat. Nos. 4,901,307 and 5,103,459 to Gilhousen et al., each being incorporated herein by reference), Time Division Multiple Access (TDMA, described in standards document IS-136, incorporated herein by reference), 80211.a and 80211.b, and Cellular Digital Packet Data (CDPD, described in CDPD Specification, Version 1.1 and U.S. Pat. No. 5,805,997 to Farris, each being incorporated herein by reference). In accordance with these wireless technologies, a wireless user transmits data to a mobile switching center (MSC). The MSC provides connectivity to the public switched telephone network (PSTN), certain multiplexing and control functions, and switching functions for wireless users. Multiplexed digital data from a plurality of remote wireless users is then capable of being transmitted via communication elements in the PSTN. In future technologies, the wireless data will be directed to the General Data Service Node, such as the Packet Data Service Node in CDMA, as opposed to routing to the MSC.

The high cost of computers and Internet access devices has created a barrier to entry for many consumers around the world. As an example, there has been very little penetration of Internet access devices in the Latin American market. However, Latin America has a very high penetration of televisions due to the popularity of soap operas and sports and the relative expense of television sets. With the large penetration and wide distribution of TVs in Latin America, it is logical to couple an affordable Internet access device with television.

Existing products include set-top boxes (STBs) that provide Internet access via the local telephone or cable television line and use a TV as a monitor. A STB is designed to produce output on a conventional television set and connect to some other communications channels such as telephone, ISDN (Integrated Services Digital Network), optical fiber, or cable. A router is a device which forwards packets between networks, based on network layer information and routing tables, often constructed by routing protocols. These products have no hard drives and limited RAM (Random Access Memory) capacity.

One of the most appealing features of a STB is in-home Internet access. The STB platform offers a convenient, affordable tool for accessing web pages, chatting, and e-mail. The newest and most expensive models of STBs include such things as 3-D games, on-demand video and music capabilities, DVD (Digital Versatile Disc) drives, VCD (Video Compact Disc) karaoke music, and digital cameras. In the Internet realm, a STB is, in effect, a specialized computer that can "talk to" the Internet—that is, it contains a web browser (which is really a HTTP (Hypertext Transfer Protocol) client) and the Internet's main program, TCP/IP (Transmission Control Protocol/Internet Protocol). STBs are manufactured by Philips, Daewoo, Netgem, Neon Technology, Paradise Innovations, and many other companies well known to those skilled in the art. STBs generally include numerous jacks and ports for audio, video, power, telephone, TV antenna, cable, and many other connections. STBs typically also come with remote wireless keyboards, and they do not necessarily have to be cable or satellite boxes.

However, one problem with Internet access using existing STBs is the unreliability of landline telephone service in many areas. Landline telephone service may not even be available in many rural areas in poorer parts of the world. However, there are existing wireless telecommunication networks in many of these same areas. In Latin America for example, existing wireless telecommunication networks are heavily used in cities but used sporadically in rural and suburban areas. These rural and suburban areas also have poor landline service if any at all.

Thus, there is a need for a system that provides Internet access to areas where landline telephone networks do not exist or are unreliable. There is also a need for a system that provides Internet access without the necessity, and expense, of a desktop or laptop personal computer, but that also allows for display of information via a conventional television set.

SUMMARY OF THE INVENTION

The present invention satisfies the above-described needs by providing methods and systems for connecting a set-top box (STB) to the Internet over existing and future wireless networks, combining television with wireless Internet access. In an exemplary environment, a conventional television is used in combination with a STB that has a wireless or wired keyboard, a power supply, and audio/visual connections for connecting the STB to the television. In one or this embodiment, a wireless telephone may be placed in a docking station on top of the STB, providing the user with both data (when docked) and voice capabilities (when being used simply for telephone calls).

In an exemplary embodiment, Code Division Multiple Access (CDMA) is used as the wireless means for connection, which is made over existing wireless telecommunications networks. CDMA should be understood to include the version originally described in standards document IS-95 as well as later generations of CDMA technology including, but not limited to, cdmaOne, CDMA2000, CDMA2000 1x, CDMA 1xEV, CDMA 1xRTT, CDMA 1xEV-DO, CDMA 1xEV-DV, and Wideband CDMA (W-CDMA). CDMA2000 1x functions at a peak packet speed of up to 307 Kbps and allows for both heavy (e.g., downloading large documents, running complex applications) and light (e.g., simple e-mail, light browsing) Internet use. In another exemplary embodiment, Cellular Digital Packet Data (CDPD) is used as the wireless means for connection, which is made over existing wireless telecommunications networks. CDPD functions at a peak packet speed of 19.2 Kbps and allows for light browsing, e-mail, and chatting services. Further embodiments may use means for wireless connection other than CDMA and CDPD, such as TDMA, GPRS, 80211.b, or 80211.a.

In an exemplary embodiment, the STB includes two boards, a video board and a modem board. The STB may be a standard unit similar to any of the STBs being currently manufactured as discussed above, except that the STB is designed or modified to support the interface between a wireless telephone and the video board rather than or in addition to supporting only a landline connection. An embodiment for both voice and data access may include a docking station connected to or atop the STB such that a wireless telephone could be used to make phone calls when not being used for Internet access. In embodiments for data access alone, PCMCIA (Personal Computer Memory Card International Association) cards (or PC cards) may be used, allowing for exchange of these cards to upgrade the device as second, third, and later generation technologies are implemented to increase transmission speed. The PCMCIA card used for communications is a wireless modem, but the card is not limited to a wireless modem and may include games, a landline modem, or other features. The PCMCIA card is useful because it allows a consumer to remove and replace the card if the STB malfunctions or needs repair rather than having to open up the STB.

Advantages of the present invention include the ability to provide Internet services in areas where local landline telephone service does not exist or exists but is not of a quality to permit reliable Internet usage and the provision of Internet access such that information can be displayed on an existing television, rather than requiring the purchase of a personal computer or monitor or having a very small or no display at all. These and other objects, features, and advantages of the present invention may be more clearly understood and appreciated from a review of the following detailed description of the disclosed embodiments and by reference to the appended drawings.

BRIEF DESCRIPTION OF THE DRAWINGS

FIG. 2 is a block diagram of an exemplary embodiment operating in an exemplary environment in accordance with the present invention.

DETAILED DESCRIPTION OF THE INVENTION

Figure 1:
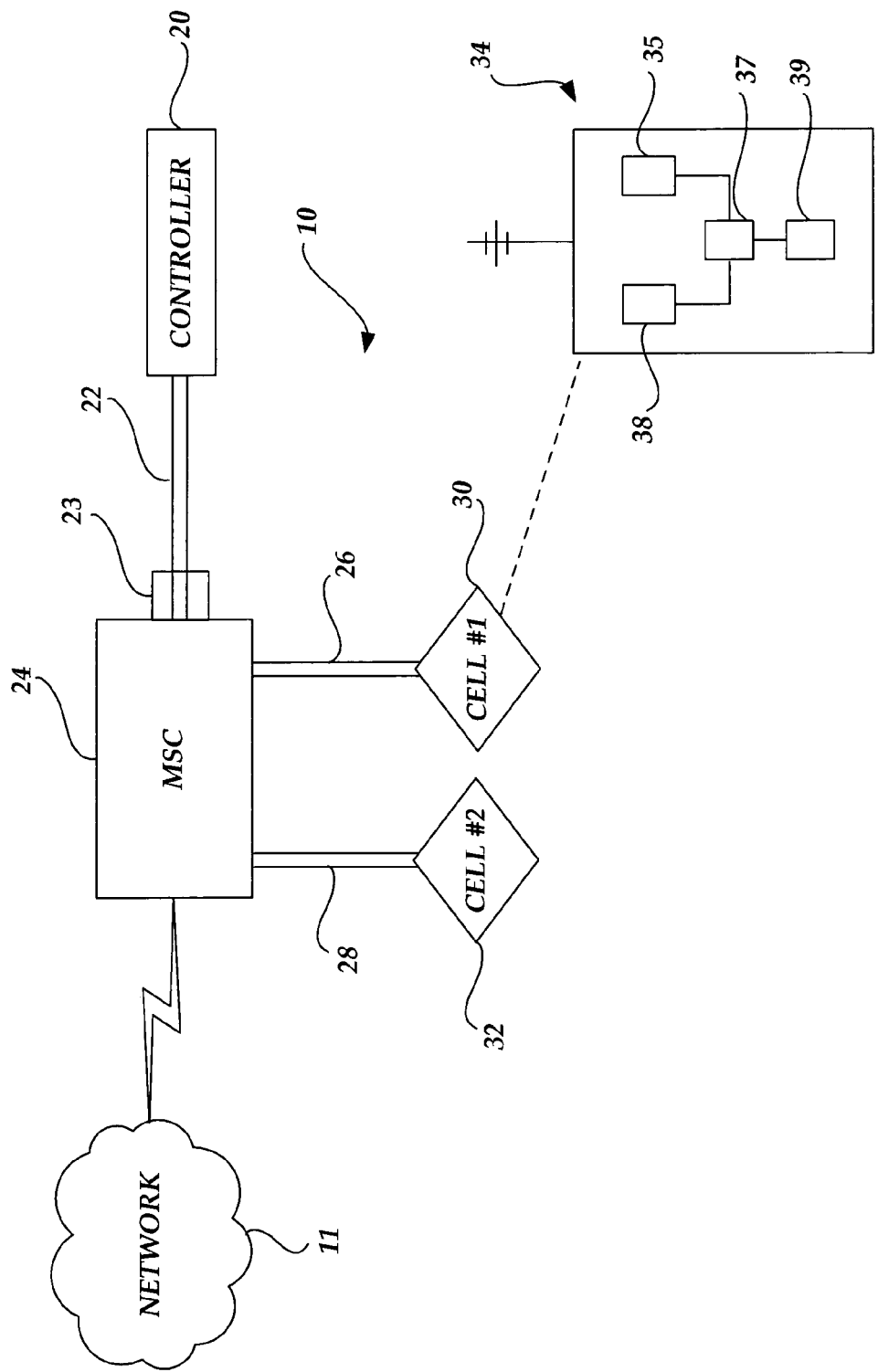
FIG. 1 illustrates a wireless network in which a wireless communications device operating in accordance with the present invention may be used.

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
| --- | --- |
| 3G | Third Generation |
| AMPS | Advanced Mobile Phone Service |
| CDMA | Code Division Multiple Access |
| CDPD | Cellular Digital Packet Data |
| CLNP | Connectionless Network Protocol |
| CSC | Central Site Controller |
| DAMPS | Digital Advanced Mobile Phone Service |
| DSMA | Digital Sense Multiple Access |
| DVD | Digital Versatile Disc |
| GSM | Global System for Mobile Communications |
| GPRS | General Packet Radio Service |
| HTTP | Hypertext Transfer Protocol |
| ICS | Intelligent Cell Site |
| ISDN | Integrated Services Digital Network |
| ITU | International Telecommunications Union |
| MC | Multi-Carrier |
| MSC | Mobile Switching Center |
| OSI | Open System Interconnection |
| PC | Personal Computer |
| PCMCIA | Personal Computer Memory Card International Association |
| PCS | Personal Communication Service |
| PPP | Point-to-Point Protocol |
| PSTN | Public Switched Telephone Network |
| RAM | Random Access Memory |
| RF | Radio Frequency |
| STB | Set-Top Box |
| TCP/IP | Transmission Control Protocol/Internet Protocol |
| TDMA | Time Division Multiple Access |
| TV | Television |
| VCD | Video Compact Disc |
| W-CDMA | Wideband Code Division Multiple Access |
| WAN | Wide Area Network |

FIG. 1 shows the components of an exemplary wireless system 10 for use according to exemplary embodiments of systems and methods of the present invention. Wireless system 10 may include, for instance, a MSC 24, multiple individual cells 30 and 32, and any other components necessary for operating wireless system 10. Typically, a plurality of such cells 30 and 32 are provided within the service area of wireless system 10. Each of cells 30 and 32 could comprise a "microcell," in which case cells 30 and 32 could be part of a "Personal Communications System" (PCS) or other similar system. Within each cell is located a transmitter that, after receiving the subscriber's signal, communicates (normally via microwave, the Public Switched Telephone Network (PSTN), or data lines) with an intermediate controller, which in turn communicates with MSC 24. Alternatively, cells 30 and 32 may communicate directly to MSC 24. As understood by those skilled in the art, MSC 24 may be eliminated if the network is a wireless digital network. In that event, a controller 20 would be coupled to the Central Site Controller ("CSC") within the wireless digital network. The CSC would couple to Intelligent Cellsites ("ICSs") at cells 30 and 32 via ISDN links. The ICSs would then communicate with a wireless telephone 34.

In any event, cells 30 and 32 are provided with a base station having Radio Frequency (RF) equipment that generally converts the control messages and voice or data signals from the subscriber to a protocol MSC 24 understands. The RF equipment communicates with, for instance, a wireless telephone 34 using any one of the well known cellular network formats, including CDMA, TDMA, CDPD, GSM, GPRS, AMPS, DAMPS, DCS 1800, JTACS, TACS, ETACS, RC 2000, NMT 450, ESMR, CT-2, WACS, or NMT 900, or any other applicable format. Generally, therefore, the RF equipment can communicate with any device having control and communication radio channels.

Coupled to wireless system 10 is a controller 20 that may be a computer system (including a workstation or PC), a microprocessor, or even an operations center staffed with appropriate personnel. A first communications link 22, which may be a land line through the PSTN or a direct connection to MSC 24, couples controller 20 to MSC 24, which connects to cells 30 and 32, respectively, via second communication links 26 and 28 that may be dedicated lines or microwave links. Optionally, first communications link 22 terminates at a dedicated roamer access port 23.

Wireless telephone 34 may be any wireless or cellular communications device that includes a data receiver 35, a processor 37, and a memory unit 39. A transmitter 38 allows wireless telephone 34 to communicate voice or data to cells 30 and 32. Data receiver 35 receives data or programming instructions via a selected radio frequency such as a wireless control channel. A data receiver is standard equipment in all modern wireless telephones. Processor 37, which is coupled to data receiver 35 and memory unit 39, controls their respective operations to cause data receiver 35 periodically, at a pre-selected time or on command, to scan the control channel. Processor 37 is preferably a microprocessor-based control system that can be programmed to conduct control operations in a known manner. Those skilled in the art will recognize that the wireless telephone may be any of a wide variety of wireless personal communication devices, including personal communicators and personal digital assistants (PDAs) which have wireless communications capabilities.

Several embodiments of the present invention utilize CDMA as the wireless means of connection, while other embodiments utilize CDPD where the CDPD system constitutes an overlay system vis-à-vis an associated cellular telephone system. These embodiments are described herein as exemplary embodiments of the present invention. A brief discussion of CDMA and CDPD technology is provided below for the reader's reference, but it should be understood that other wireless communications formats, such as any of those mentioned above (including both presently existing and future versions), may also be used in accordance with methods and systems of the present invention.

CDMA was first developed by Qualcomm® Incorporated of San Diego, Calif., U.S.A. As used herein, CDMA is a generic term that describes a wireless air interface based on code division multiple access technology and, as indicated above, should be understood to include IS-95A, IS-95B, cdmaOne™, CDMA2000, CDMA2000 1x, CDMA 1xEV, CDMA 1xRTT, CDMA 1xEV-DO, CDMA 1xEV-DV, W-CDMA, and future CDMA technologies. CDMA technology is well understood by those skilled in the art. For more information than is provided below, the reader is referred to standards document IS-95 and U.S. Pat. Nos. 4,901,307 and 5,103,459 to Gilhousen et al.

The first CDMA networks were commercially launched in 1995. CDMA applies spread spectrum techniques to a multiple access system with each user being separated from every other user by a unique digital code (there are approximately 4.4 trillion codes). There are two spread spectrum techniques, frequency hopped and direct sequence. Regardless of the technique used, the technology breaks up speech and data into small, digitized segments and encodes each of them. A large number of users can thus share the same band of spectrum and greatly increase system capacity. In other words, CDMA allows wireless service providers to squeeze more digital signals into a particular slice of the radio network.

CDMA has become the fastest-growing of all wireless technologies, with over 100 million subscribers worldwide. In 1999, the International Telecommunications Union (ITU) adopted an industry standard for third-generation (3G) wireless systems that can deliver high-speed data and other new features. CDMA2000 was sanctioned along with four other terrestrial IMT-2000 standards. CDMA2000 1x and CDMA 1xEV (including 1xEV-DO and 1xEV-DV) are part of what the ITU has termed IMT-2000 CDMA Multi-Carrier (MC). For further information, the reader is referred to <www.imt-2000.org>. CDMA2000 1x doubles the voice capacity of cdmaOne networks and delivers packet data speeds of 153 kbps (release 0) and 307 kbps (release 1) in mobile environments. CDMA2000 1xEV-DO and CDMA2000 1xEV-DV provide data-optimized channels, offering data rates well in excess of 2 Mbps.

CDMA2000 is designed to operate in all existing allocated spectrums for wireless telecommunications, including analog, cellular, PCS, and IMT-2000 bands. CDMA2000 delivers 3G services while occupying a small amount of spectrum, 1.25 MHz per carrier. CDMA2000 supports the second generation network aspect of all existing operators regardless of technology (cdmaOne, IS-136 TDMA, or GSM). CDMA2000 spectrum bands include 450, 700, 800, 900, 1700, 1800, 1900, and 2100 MHz. Over 100 CDMA200 1x and now CDMA2000 1xEV-DO terminals are currently available from vendors including Audiovox, Ericsson, Kyocera, LG Electronics, Motorola, Nokia, Samsung, and Sanyo. In addition to wireless phones, wireless modem products are available from AirPrime, AnyDATA, GTRAN, Novatel Wireless, Sierra Wireless, and others.

CDPD is an overlay system that enables wireless transmission of data over existing cellular systems, such as those discussed above (AMPS, DAMPS, CDMA, TDMA, GSM, etc.). The CDPD system is designed to provide data communications in the cellular frequency range without impeding voice communications. CDPD networks first appeared in the mid-1990s, and today they are available in most large cities. CDPD is cost effective because it builds on top of existing cellular infrastructure and does not require any additional spectrum allocation. Instead of requiring additional frequencies for data communications, CDPD uses temporal "gaps" that occur between voice calls to send data in bursts. CDPD technology is well understood by those skilled in the art. For more information than is provided below, the reader is referred to CDPD Specification, Version 1.1 and U.S. Pat. No. 5,805,997 to Farris.

The system uses "mobile" telephone channels just as a modem uses a telephone line but it is designed to jump from one frequency to another when necessary, i.e., when a new telephone call starts in the cell. Technology has been developed to "frequency hop" and seek out gaps in cellular conversations in the cellular spectrum. The frequency-hopping technology is sufficiently robust to handle the designed data transfer rate (19.2 Kbps) in crowded cellular markets. In addition, new personal wireless communications products have been, and are being, designed to employ CDPD technology in combining all-purpose mobile communications with the technology of cellular phones, fax machines, modems, electronic mail, and pen computing. Because CDPD is an open specification that adheres to the layered structure of the Open Systems Interconnection (OSI) model, which is well understood by those skilled in the art, it has the ability to be extended in the future. CDPD supports both the Internet's TCP/IP format and the ISO Connectionless Network Protocol (CLNP).

With CDPD, a computer interfaces to a network such as the Internet in a manner very similar to using a regular landline connection, except a modem that speaks in the CDPD language is used. A number of companies manufacture cellular data modems, including, for example, Mitsubishi, Motorola, Novatel, and other companies that were mentioned above. For the mobile user, CDPD's support for packet switching means that a persistent link is not needed. The same broadcast channel can be shared among a number of users at the same time. The user's modem recognizes the packets intended for its user. As data such as e-mail arrives, it is forwarded immediately to the user without a circuit connection having to be established.

Referring now to FIG. 2, an exemplary system for wireless Internet access where information is to be displayed on a conventional television using a STB is shown. A television 100 is connected to a STB 102 via one or more connectors 104, including, for example, a coaxial cable, left and right audio wires, S-video cable, video cable, or other audio and/or video cables. STB 102 contains a video board 106. Video board 106 includes a microprocessor 108, a television interface 110, and numerous other components. Video board 106 may generally be any of a number of standard video boards currently manufactured and used in STBs, such as those manufactured by the companies discussed in the Background section of this specification or others. Thus, a further discussion of video board components is not necessary with regard to the present invention.

A docking station 112 is present in STB 102. Wireless telephone 34 is inserted into docking station 112 for the invention to be operative. When out of docking station 112, wireless telephone 34 may be used as it normally would for voice communications. Alternatively, STB 102 may have a port for the insertion of a wire or cable that connects a separate docking station; for example, something similar to a wireless telephone battery charger that holds the phone and plugs into an electrical outlet.

As discussed above in conjunction with FIG. 1, wireless telephone 34 includes data receiver 35, processor 37, transmitter 38, and memory unit 39. In this exemplary embodiment, wireless telephone 34 also includes a modem 40. Modem 40 receives and transmits data packets directly to a cellular or wireless system, such as wireless system 10 in FIG. 1. The wireless system is interfaced with a wide area network (WAN) 11 (see FIG. 1), such as the Internet via an IN/IP gateway for example.

Internal to STB 102 is a modem board 114. Modem board 114 allows for data transmissions between wireless telephone 34 and the Internet to be interfaced with video board 106 via bus 116. This interface furthers preparation of the data for display on television 100. In an alternate embodiment without a wireless telephone and for data services only, the docking station may be eliminated and modem 40 may be part of a PCMCIA card that interfaces directly with modem board 114 inside STB 102.

A power supply 118 is used to power STB 102. It may function through AC-to-DC conversion from a power outlet or in certain instances be comprised of a battery pack. In an embodiment, STB 102 may be configured such that power supply 118 recharges wireless telephone 34 when the power supply is active (i.e., plugged in or charged, if a battery pack) and the telephone is docked. A printed wiring board 120 may be included in STB 102 and is used to control communications between a user and the TV and STB. An example is the use of a wireless keyboard 122, which communicates with board 120 using an infrared signal. A mouse or remote control may also be used in a similar manner if board 120 is so configured. Board 120 is technically embodied similar to a browser circuit used in a landline STB and is well understood by those skilled in the art.

In another exemplary embodiment, a STB originally designed for a landline telephone connection may be modified for a wireless telephone connection. In this embodiment, a wireless communications device, which contains a wireless modem, is mounted inside the STB as part of the modem board. Alternatively, a PCMCIA card with a wireless modem could be used or another type of wireless modem may be used. An adapter, including a programmable microcontroller chip containing unique software code that interfaces the modem to the video board, is also included. The adapter also contains a FIFO chip that interfaces asynchronous data output of the modem to the video board. As an example, the micro-controller chip may employ a 3.6864 MHz crystal as an internal oscillator and provide the correct clock signal to the FIFO chip. As another alternative, the battery of the wireless telephone and/or wireless modem may be charged from the +12 volts DC power bus of the video board, eliminating the need for an additional power supply.

An exemplary method according to one of the embodiments described in the paragraph above includes an adapter or interfacing agent filtering the data stream from each of the wireless communications device and the STB. For an embodiment using CDPD as the wireless means of transmission, a portion of the initialization string triggers the wireless communications device to enter CDPD mode. After the initialization string, the interfacing agent sends a command to the wireless communications device to connect to the network, such as the Internet, in PPP (Point-to-Point Protocol) mode. Optionally, the interfacing agent, acting as a dialing protocol converter, may then output the appropriate strings and cause the wireless communications device to enter CDPD mode in addition to connecting the CDPD modem to the network. When the wireless communications device connects to the network, the network responds with a 23 bytes PPP packet that will not be accepted by the STB. Thus, the interfacing agent filters this packet to suppress it. The interfacing agent checks the data stream after the CONNECT string, and suppresses the next 23 bytes so that they are not passed to the STB. The transmission of data to the STB via the wireless communications device then proceeds.

From the foregoing description of the exemplary embodiments of the present invention and operation thereof, other embodiments will suggest themselves to those skilled in the art. It should be understood that the present invention is not limited to the use of wireless telephones but includes other wireless communications devices that may be used to access a wireless network. It should also be understood that means of wireless data transmission other than CDMA and CDPD, including, for example, TDMA, 80211.a and 80211.b, and GPRS, are contemplated by the present invention.

What is claimed is:

1. A method for communicating between a remote data network and a set-top box via a wireless communications device with a cellular digital packet data (CDPD) modem, comprising:

inserting the wireless communications device in a docking station of the set-top box before triggering the wireless communications device to enter CDPD mode;

sending a command instructing the wireless communications device to connect to the remote data network in point-to-point protocol (PPP) mode;

upon connection to the remote data network, receiving a data stream from the remote data network including a PPP data packet;

filtering the data stream after receiving a first string and before suppressing a number of bytes associated with the PPP data packet; and after suppressing the number of bytes associated with the PPP data packet, transmitting the data stream to the set-top box.

2. The method of claim 1, wherein the wireless communications device is a wireless telephone and the set-top box includes a docking station in which the wireless telephone is inserted.

3. The method of claim 1, further comprising preparing the data stream for display on a television set connected to the set-top box.

4. The method of claim 1, further comprising receiving infrared control signals from a user utilizing a peripheral device, wherein the peripheral device is a wireless keyboard.

* * * * *